US010459127B2

(12) United States Patent
Chen et al.

(10) Patent No.: US 10,459,127 B2
(45) Date of Patent: Oct. 29, 2019

(54) FOURIER LENS, METHOD FOR DESIGNING FOURIER LENS, AND SCHLIEREN APPARATUS

(71) Applicant: NANKAI UNIVERSITY, Tianjin (CN)

(72) Inventors: Shuqi Chen, Tianjin (CN); Wenwei Liu, Tianjin (CN); Hua Cheng, Tianjin (CN); Jianguo Tian, Tianjin (CN)

(73) Assignee: NANKAI UNIVERSITY, Tianjin (CN)

( * ) Notice: Subject to any disclaimer, the term of this patent is extended or adjusted under 35 U.S.C. 154(b) by 81 days.

(21) Appl. No.: 15/720,221

(22) Filed: Sep. 29, 2017

(65) Prior Publication Data
US 2019/0041552 A1    Feb. 7, 2019

(30) Foreign Application Priority Data

Aug. 3, 2017   (CN) .......................... 2017 1 0655642

(51) Int. Cl.
*G02B 3/08*    (2006.01)
*G02B 27/00*   (2006.01)
(Continued)

(52) U.S. Cl.
CPC .............. *G02B 3/08* (2013.01); *G02B 5/1876* (2013.01); *G02B 6/107* (2013.01); *G02B 6/122* (2013.01);
(Continued)

(58) Field of Classification Search
CPC ........ G02B 3/08; G02B 5/1876; G02B 6/107; G02B 6/122; G02B 27/0012; G02B 27/0087; G02B 27/46; G02B 27/54
(Continued)

(56) References Cited

U.S. PATENT DOCUMENTS

2010/0315565 A1   12/2010   Bloom et al.
2012/0328240 A1*  12/2012   Ma ........................ B82Y 20/00
                                                        385/33

FOREIGN PATENT DOCUMENTS

CN      105807441 A      7/2016
GB        2493517 A      2/2013

OTHER PUBLICATIONS

Notification to Grant Patent Right for Invention issued in corresponding Application No. CN201710655642.9 dated Apr. 3, 2019.
(Continued)

*Primary Examiner* — James R Greece
(74) *Attorney, Agent, or Firm* — Carter, DeLuca & Farrell LLP

(57) ABSTRACT

Provided are a Fourier lens, a method for designing a Fourier lens, and a schlieren apparatus. The Fourier lens includes a substrate and a plurality of cuboid waveguides. The plurality of waveguides are arranged on the substrate in parallel and spaced from each other at a preset interval. The material of the substrate and the material of the waveguides are all transparent to the working waveband of the Fourier lens. The preset interval is smaller than a quotient obtained by dividing a center wavelength of the working waveband by the refractive index of the substrate. The waveguide has a plurality of widths, and the waveguides of different widths correspond to different phase delays. The individual waveguides are arranged on the substrate according to phase delays required at different positions. According to the embodiments, the range of the working angle of the Fourier lens can be increased.

7 Claims, 6 Drawing Sheets

(51) Int. Cl.
  *G02B 6/122*  (2006.01)
  *G02B 27/54*  (2006.01)
  *G02B 6/10*  (2006.01)
  *G02B 5/18*  (2006.01)
  *G02B 27/46*  (2006.01)

(52) U.S. Cl.
  CPC ..... *G02B 27/0012* (2013.01); *G02B 27/0087* (2013.01); *G02B 27/46* (2013.01); *G02B 27/54* (2013.01)

(58) Field of Classification Search
  USPC .......................................................... 359/742
  See application file for complete search history.

(56) References Cited

OTHER PUBLICATIONS

First Office Action issued in corresponding Application No. 201710655642.9 dated Feb. 3, 2019.

\* cited by examiner

FOURIER LENS, METHOD FOR DESIGNING FOURIER LENS, AND SCHLIEREN APPARATUS

TECHNICAL FIELD

The present invention relates to the technical field of optics, and particularly to a Fourier lens, a method for designing a Fourier lens, and a schlieren apparatus.

BACKGROUND ART

Different from a conventional imaging lens, a Fourier lens may exhibit, on a spectrum plane thereof, an intensity distribution assuming a linear relationship with the spatial frequency of incident light, and it has important applications in many fields, such as spatial light filtering, holography, information processing, compressed sensing and high-resolution imaging.

Spatial spectrum distortion means that there is a difference between the ideal and practical positions of the light spot, on a back focal plane of a Fourier lens, of parallel light rays incident onto the Fourier lens. In order to guarantee accurate spatial spectrum distribution, it is necessary to make the Fourier lens produce a distortion value having an equal magnitude but an opposite sign to the nonlinear error value of a spectral point. If the lens is not subject to aberration correction in an ordinary way, with appropriate distortion retained but with spherical aberration and coma aberration of the lens eliminated, then emergent light rays are required to meet the Abbe sine condition. As can be known from the aberration theory, in the process of eliminating the spherical aberration and coma aberration of the lens, a certain amount of distortion will inevitably be left. In the prior art, a lens made of a continuous medium (such as glass or other transparent mediums) are used, such that the aberration caused by the amount of distortion is compensated by making the lens have different thicknesses at different regions.

Since the aberration of the Fourier lens is compensated by making the lens have different thicknesses at different regions in the prior art, such a design essentially relies on the phase difference accumulated during the propagation of light rays in the medium, which belongs to the scope of geometrical optics. As a result, the working angle of the existing Fourier lens still needs to meet the paraxial condition (which generally requires the angle not to be larger than 30°), that is, the range of the working angle is small.

DISCLOSURE OF THE INVENTION

In view of the above, the object of the present invention is to provide a Fourier lens, a method for designing a Fourier lens, and a schlieren apparatus, so as to increase the range of working angle of the Fourier lens.

In a first aspect, an embodiment of the present invention provides a Fourier lens, which includes a substrate and a plurality of cuboid waveguides. The plurality of waveguides are arranged on the substrate in parallel and spaced from each other at a preset interval. A material of the substrate and a material of each of the waveguides are all transparent to a working waveband of the Fourier lens. The preset interval is smaller than a quotient obtained by dividing a center wavelength of the working waveband by a refractive index of the substrate.

The waveguides have a plurality of widths, the waveguides of different widths correspond to different phase delays, and the individual waveguides are arranged on the substrate according to phase delays required at different positions.

In combination with the first aspect, an embodiment of the present invention provides a first possible implementation of the first aspect, specifically, the material of the substrate includes glass, silicon dioxide or silicon nitride.

In combination with the first aspect, an embodiment of the present invention provides a second possible implementation of the first aspect, specifically, the material of the waveguides includes amorphous silicon, germanium, titanium dioxide or tellurium.

In combination with the first aspect, an embodiment of the present invention provides a third possible implementation of the first aspect, specifically, the substrate is a glass substrate, and the waveguide is an amorphous silicon waveguide.

The preset interval is 450 nm. The amorphous silicon waveguides have eight widths, with the eight widths being 390 nm, 300 nm, 250 nm, 205 nm, 160 nm, 135 nm, 120 nm and 110 nm, respectively.

In combination with the third possible implementation of the first aspect, an embodiment of the present invention provides a fourth possible implementation of the first aspect, specifically, a height of each of the amorphous silicon waveguides is 1.05 μm, and a length of each of the amorphous silicon waveguides is greater than or equal to 10 μm.

In a second aspect, an embodiment of the present invention further provides a method for designing a Fourier lens, in which the Fourier lens is the Fourier lens as described in the first aspect. The method includes:

determining, according to a working waveband of the Fourier lens to be designed, a material of the substrate and a material of the waveguides;

performing, according to the working waveband, the material of the substrate and the material of the waveguides, an electromagnetic wave simulation to determine parameters of the waveguides, wherein the parameters of the waveguides include: a height of the waveguides, a plurality of widths of the waveguides, and a preset interval between adjacent waveguides;

determining, according to a designed focal length and the preset interval of the Fourier lens, positions where the plurality of waveguides are arranged on the substrate; and manufacturing, with a micromachining technology, the Fourier lens according to the parameters and the positions where the waveguides are arranged.

In combination with the second aspect, an embodiment of the present invention provides a first possible implementation of the second aspect, specifically, the step of performing, according to the working waveband, the material of the substrate and the material of the waveguides, an electromagnetic wave simulation to determine parameters of the waveguides includes:

selecting the height of the waveguides according to the working waveband, and selecting the preset interval between adjacent waveguides according to the material of the substrate and the working waveband;

performing, according to the material of the waveguides, the selected height of the waveguides and the preset interval, an electromagnetic wave simulation with a Finite Difference Time Domain method or a Finite Element Method, so as to obtain a set of simulation results representative of a correspondence between the widths of the waveguide and phase delays; and selecting a plurality of simulation results from the set of simulation results, with the selected simulation results covering the phase delays greater than or equal to −π and smaller than π, and adding the widths of the waveguides, corresponding to the individual phase delays from the selected simulation results, into the parameters of the waveguides of the Fourier lens.

In combination with the second aspect, an embodiment of the present invention provides a second possible implementation of the second aspect, specifically, the step of determining, according to a designed focal length and the preset interval of the Fourier lens, positions where the plurality of waveguides are arranged on the substrate includes:

determining, according to the preset interval, a plurality of positions where the plurality of waveguides are to be arranged on the substrate;

determining phase arrangement of the Fourier lens, according to a distance between each of the positions where the plurality of waveguides are to be arranged and a centerline of the substrate, and according to the designed focal length, wherein the phase arrangement indicates a phase delay corresponding to each of the positions where the plurality of waveguides are to be arranged; and determining, according to the phase arrangement, the positions where the plurality of waveguides are arranged on the substrate.

In combination with the second possible implementation of the second aspect, an embodiment of the present invention provides a third possible implementation of the second aspect, specifically, the phase delay corresponding to one of the positions where the plurality of waveguides are to be arranged is calculated by the following formula:

$$\varphi(r) = -\frac{kr^2}{2f},$$

where φ(r) represents the phase delay corresponding to r, r represents the distance, k represents the magnitude of a wave vector corresponding to the center wavelength of the working waveband, and f represents the designed focal length.

In a third aspect, an embodiment of the present invention further provides a schlieren apparatus, which includes a light source, a collimating lens, a cavity, a schlieren head, a first lens, a diaphragm, a second lens and an outlet which are arranged sequentially along a propagation direction of incident light. Each of the first lens and the second lens is the Fourier lens as described in the first aspect, and the cavity is configured for accommodating a test fluid flowing through the schlieren apparatus.

The embodiments of the present invention provide the following advantageous effects:

in the embodiments of the present invention, the Fourier lens includes the substrate and the plurality of cuboid waveguides. The plurality of waveguides are arranged on the substrate in parallel and spaced from each other at a preset interval. The material of the substrate and the material of each of the waveguides are all transparent to the working waveband of the Fourier lens, and the preset interval is smaller than the quotient obtained by dividing the center wavelength of the working waveband by the refractive index of the substrate. The waveguides have a plurality of widths, the waveguides of different widths correspond to different phase delays, and the individual waveguides are arranged on the substrate according to the phase delays required at different positions. In the Fourier lens provided by the embodiments of the present invention, the used waveguides are not continuously distributed, and the preset interval between adjacent waveguides is smaller than the quotient obtained by dividing the center wavelength of the working waveband by the refractive index of the substrate, thus the waveguides constitute an array antenna with sub-wavelength structure. With the array antenna with sub-wavelength structure, the incident light is locally regulated, specifically, the wave front of the incident light is changed by means of the waveguides of different widths, which does not belong to the scope of geometrical optics. Therefore, the working angle of such Fourier lens does not need to meet the paraxial condition, which makes the range of the working angle of the Fourier lens increased.

Other features and advantages of the present invention will be explained in the following description, and parts of them will become obvious from the description, or can be understood by carrying out the present invention. The object and other advantages of the present invention are realized and obtained through the structures particularly mentioned in the description, the claims and the drawings.

In order to make the above object, features and advantages of the present invention clearer and easier to understand, detailed description of preferred embodiments is given with reference to the accompanying drawings.

BRIEF DESCRIPTION OF DRAWINGS

In order to more clearly illustrate the embodiments of the present invention or technical solutions in the prior art, drawings required to be used in the description of the embodiments or the prior art will be briefly introduced below. Apparently, the following drawings illustrate only some of the embodiments of the present invention, and for a person of ordinary skills in the art, other drawings may also be obtained from these drawings without any inventive effort.

REFERENCE SIGNS:

100-waveguide; 200-substrate; L1-collimating lens; L2-first lens; and L3-second lens.

DETAILED DESCRIPTION OF EMBODIMENTS

In order to make the objects, technical solutions and advantages of the embodiments of the present invention clearer, the technical solutions of the present invention will be described clearly and completely below with reference to the drawings. Apparently, the described embodiments are some rather than all of the embodiments of the present invention. All the other embodiments, obtained by a person of ordinary skills in the art on the basis of the embodiments of the present invention without any inventive effort, shall be covered by the scope of protection of the present invention.

Presently, in the prior art, the aberration of the Fourier lens is compensated by making the lens have different thickness at different regions, and thus the working angle of the existing Fourier lens still needs to meet the paraxial condition, which causes the range of the working angle to be small. In view of this, the embodiments of the present invention provide a Fourier lens, a method for designing a Fourier lens and a schlieren apparatus, which enable the range of the working angle of the Fourier lens to be increased.

In order to facilitate the understanding of the embodiments, detailed description is made first on the Fourier lens disclosed in the embodiments of the present invention.

First Embodiment

Figure 1A:
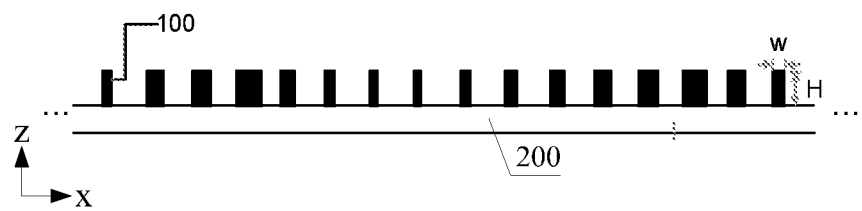
FIG. 1a is a side view showing a schematic structure of a Fourier lens provided by an embodiment of the present invention.
Figure 1B:
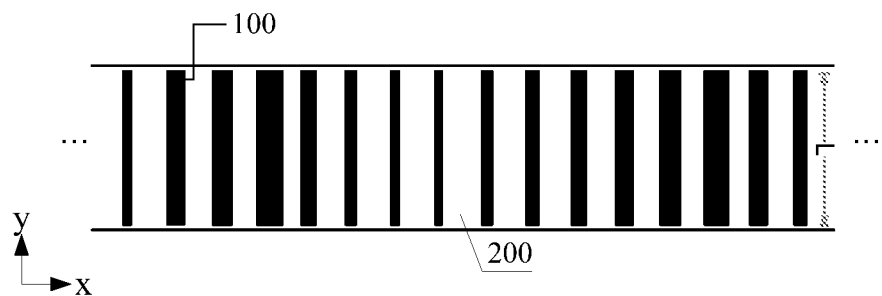
FIG. 1b is a top view showing the schematic structure of the Fourier lens provided by the embodiment of the present invention.

FIG. 1a is a side view (in the x-z plane) showing a schematic structure of a Fourier lens provided by an embodiment of the present invention, and FIG. 1b is a top view (in the x-y plane) showing the schematic structure of the Fourier lens provided by the embodiment of the present invention. In the figures, the x direction is a direction perpendicular to the waveguides, the y direction is a direction parallel to the waveguides, the z direction is a direction along which light is propagated, W represents the width of the waveguide, H represents the height of the waveguide, and L represents the length of the waveguide.

As shown in FIGS. 1a and 1b, the embodiment of the present invention provides a Fourier lens, which includes a substrate 200 and a plurality of cuboid waveguides 100. The plurality of waveguides 100 are arranged on the substrate 200 in parallel and spaced from each other at a preset interval. The waveguides 100 have a plurality of widths, the waveguides 100 of different widths correspond to different phase delays, and the individual waveguides 100 are arranged on the substrate 200 according to the phase delays required at different positions. A material of the substrate 200 and a material of each of the waveguides 100 are all transparent to the working waveband of the Fourier lens. The preset interval is an interval between centers of adjacent waveguides 100, and the preset interval is smaller than a quotient obtained by dividing a center wavelength of the working waveband by a refractive index of the substrate 200.

Specifically, the working waveband of the Fourier lens is related to the material of the waveguides 100. Generally, the refractive index of the material of the waveguides 100 should be greater than 2.5. The material of the waveguides 100 may include amorphous silicon, germanium (Ge), titanium dioxide ($TiO_2$), tellurium (Te) or the like. The working waveband corresponding to the amorphous silicon is 800 nm-1700 nm (with a refractive index of 3.5, and no absorption), the working waveband corresponding to Ge is 1.5 μm-10 μm, the working waveband corresponding to $TiO_2$ is 400 nm-800 nm, and the working waveband corresponding to Te is 3.5 μm-50 μm.

The material of the substrate 200 may include glass, silicon dioxide ($SiO_2$), silicon nitride ($Si_3N_4$) or the like. Specifically, the glass substrate is relatively common and cheap; the $SiO_2$ substrate is also relatively common, and can be easily manufactured; and the $Si_3N_4$ substrate has a high strength, and is light and thin, which makes it more suitable for integrated optical devices. The substrate 200 is configured for supporting the waveguides 100, and there is no strict limitation on the thickness of the substrate 200.

As shown in FIGS. 1a and 1b, the waveguides 100 have a same height H and a same length L, but different widths W. The waveguide 100 is of a sub-wavelength micro-nano structure, and the height H thereof is generally greater than 30% of the wavelength (the center wavelength of the working waveband of the Fourier lens). Such Fourier lens is equivalent to a cylindrical lens, and thus, there is no strict limitation on the length L, which is generally not shorter than 10 μm. The incident light is preferably incident onto the substrate 200 and exits from the waveguides 100, which can prevent the refractive index of the substrate 200 from affecting the designed focal length of the Fourier lens.

In the prior art, the wave front of the incident light is regulated by means of a continuous medium having different thicknesses at different positions, which is confined by the conventional geometrical optics. However, in the embodiment of the present invention, the used waveguides 100 are not continuously distributed, so that the incident light can be locally regulated by means of a array antenna with sub-wavelength structure (the preset interval between adjacent waveguides 100 is smaller than the quotient obtained by dividing the center wavelength of the working waveband by the refractive index of the substrate 200, and the waveguides 100 thus constitute the array antenna with sub-wavelength structure), based on the Maxwell's equations on electromagnetic wave. As a result, the individual silicon waveguides 100 of different widths generate different phase delays for the incident light, thereby changing the wave front of the incident light. With the array antenna with sub-wavelength structure, the incident light is locally regulated, specifically, the wave front of the incident light is changed by means of the waveguides of different widths, which does not belong to the scope of geometrical optics. Therefore, the working angle of such Fourier lens does not need to meet the paraxial condition, which makes the range of the working angle of the Fourier lens increased, with a range of 0°-60° available for the working angle.

In addition, the Fourier lens, consisting of the substrate 200 and the waveguides 100 with sub-wavelength micro-nano structure, has a relatively small volume, and the volume may be at the micrometer scale (for example, the volume may be 100 μm×190 μm×the thickness of the lens, the lens thickness of the Fourier lens is the sum of the height H (which may be 1.05 μm) and the thickness of the substrate 200). Therefore, the Fourier lens can be easily integrated and thus meet the modern trend and requirement of integration and miniaturization of optics, and is very suitable for the field of integrated optics.

In the prior art, in order to eliminate the aberration of the Fourier lens, complicated technological means are required, and there is extremely high precision requirement on the thickness of the lens. However, with the structural design of the Fourier lens provided by the embodiment of the present invention, the aberration is extremely small in nature; therefore, no complicated and precise technology is required to eliminate the aberration.

Further, the focal length of the Fourier lens provided by the embodiment of the present invention can be easily designed. As the preset interval between adjacent waveguides 100 is related to the focal length, the focal length of the Fourier lens can be changed simply by changing the preset interval.

In the embodiment of the present invention, the Fourier lens includes the substrate and the plurality of cuboid waveguides. The plurality of waveguides are arranged on the substrate in parallel and spaced from each other at a preset interval. The material of the substrate and the material of each of the waveguides are all transparent to the working waveband of the Fourier lens, and the preset interval is smaller than the quotient obtained by dividing the center wavelength of the working waveband by the refractive index of the substrate. The waveguides have a plurality of widths, the waveguides of different widths correspond to different phase delays, and the individual waveguides are arranged on the substrate according to the phase delays required at different positions. In the Fourier lens provided by the embodiment of the present invention, the used waveguides are not continuously distributed, and the preset interval between adjacent waveguides is smaller than the quotient obtained by dividing the center wavelength of the working waveband by the refractive index of the substrate, thus the waveguides constitute an array antenna with sub-wavelength structure. With the array antenna with sub-wavelength structure, the incident light is locally regulated, specifically, the wave front of the incident light is changed by means of the waveguides of different widths, which does not belong to the scope of geometrical optics. Therefore, the working angle of such Fourier lens does not need to meet the paraxial condition, which makes the range of the working angle of the Fourier lens increased.

Figure 2:
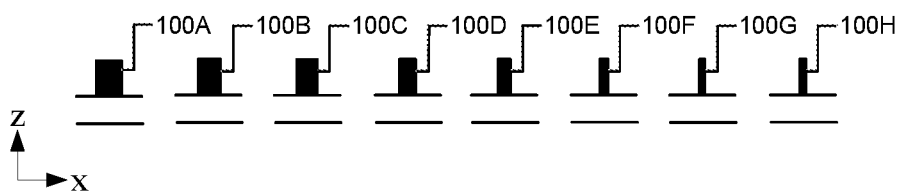
FIG. 2 is a schematic diagram showing waveguides of eight widths in the Fourier lens according to an embodiment of the present invention.
Figure 3:
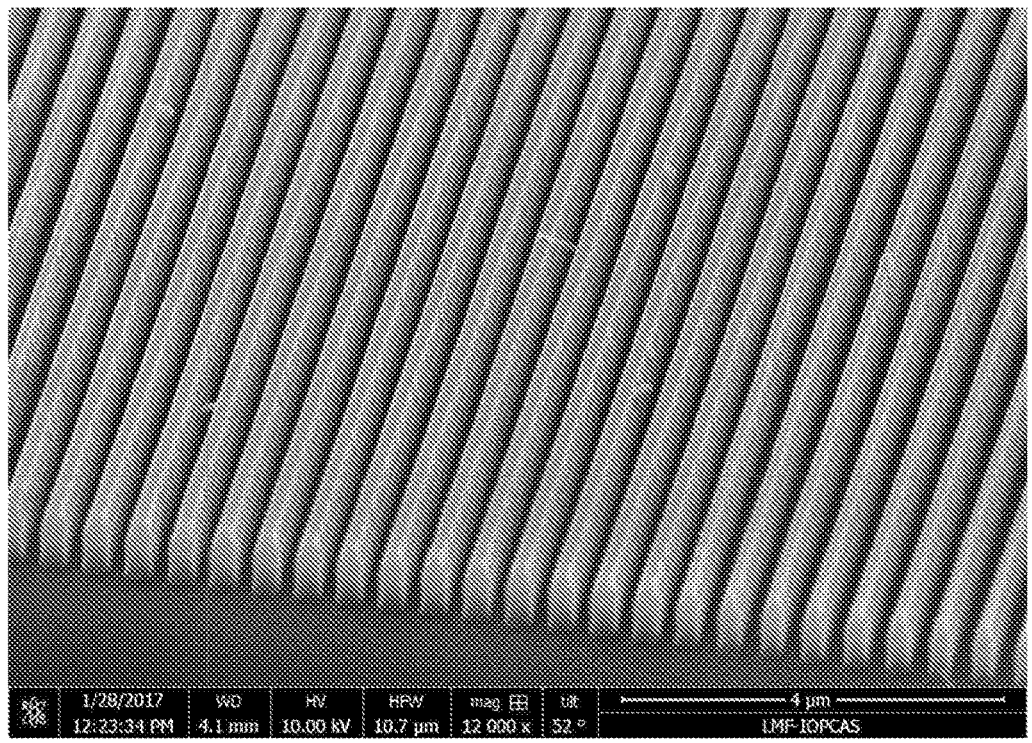
FIG. 3 is an SEM image of a Fourier lens sample provided by an embodiment of the present invention.

In one example, a glass substrate and amorphous silicon waveguides are used, the preset interval is 450 nm, the height H is 1.05 μm, the length L is 100 μm, and eight widths are selected, and the size of the Fourier lens is 100 μm×190 μm (length×width). Specifically, as shown in FIG. 2, the eight widths are 100A: 390 nm, 100B: 300 nm, 100C: 250 nm, 100D: 205 nm, 100E: 160 nm, 100F: 135 nm, 100G: 120 nm, and 100H: 110 nm, respectively. In order to be lighter and thinner, a $Si_3N_4$ substrate may be used. In this case, the dimension parameters of the amorphous silicon waveguides will be changed slightly. The SEM (Scanning Electron Microscope) image of a Fourier lens sample, which is designed according to these parameters and manufactured by means of the commercialized electron beam lithography, is shown in FIG. 3.

In order to demonstrate the advantageous effects of the Fourier lens provided by the embodiment of the present invention, a variety of tests are carried out on the Fourier lens sample as mentioned above. In the experiments, the used incident light has been subjected to intensity modulation and is in a polarization state with the direction of polarization along the y-direction, and the incident light is incident onto the glass substrate and exits from the amorphous silicon waveguides. The detailed contents are as follows.

Figure 4:
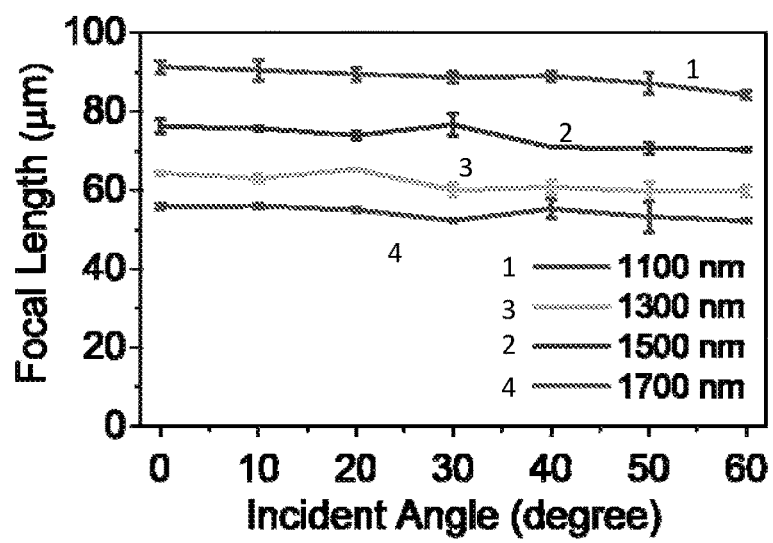
FIG. 4 is a diagram showing focal lengths of the Fourier lens which are measured under different incident wavelengths and different incident angles.

FIG. 4 is a diagram showing focal lengths of the Fourier lens which are measured under different incident wavelengths and different incident angles. As shown in FIG. 4, for incident angles ranging from 0°-60°, the focal lengths measured at a same incident wavelength (under plane wave incidence) are nearly the same (only seven discrete angles, i.e., 0°, 10°, 20°, 30°, 40°, 50° and 60°, are shown in the figure, and consistent conclusions can be drawn for other angles in the range; the same is true for the following cases), which reflects that the Fourier lens has no obvious field curvature. Although only four discrete wavelengths, i.e., 1-1100 nm, 3-1300 nm, 2-1500 nm and 4-1700 nm, are shown herein, consistent conclusions can be drawn for other wavelengths in the range (the same is true for the following cases).

Figure 5:
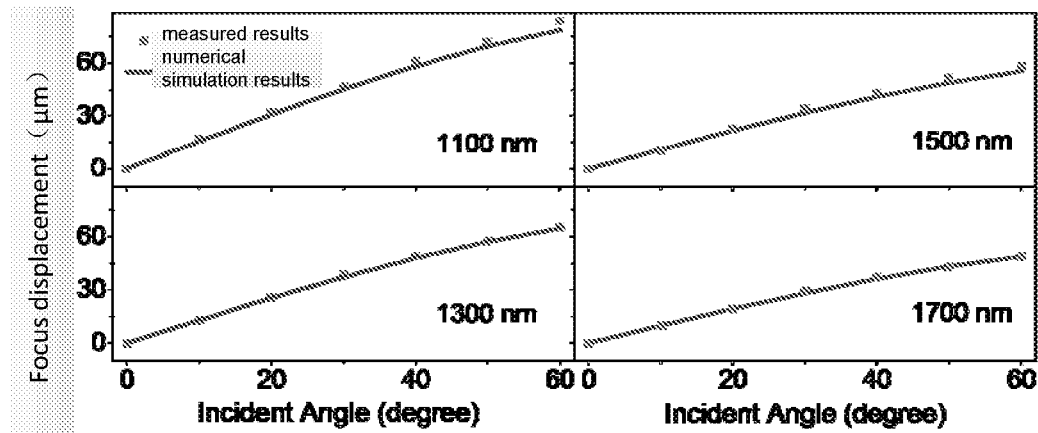
FIG. 5 is a diagram showing numerical simulation results and experimental results of focus displacement under different incident wavelengths and different incident angles.

FIG. 5 is a diagram showing numerical simulation results and experimental results of focus displacement under different incident wavelengths and different incident angles. In the figure, the solid line represents the numerical simulation results, and the function used for the simulation is f·sin θ (f is the focal length, and θ is the incident angle); and the squares represent the measured results. In the figure, only seven discrete angles, i.e., 0°, 10°, 20°, 30°, 40°, 50° and 60°, as well as four discrete wavelengths, i.e., 1100 nm, 1300 nm, 1500 nm and 1700 nm, are shown. As can be seen from FIG. 5, the focal displacement obtained by the numerical simulation well coincide to the focal displacement measured through experiments, which indicates that the focus displacement at different incident angles meets the requirements of Fourier transform.

Figure 6:
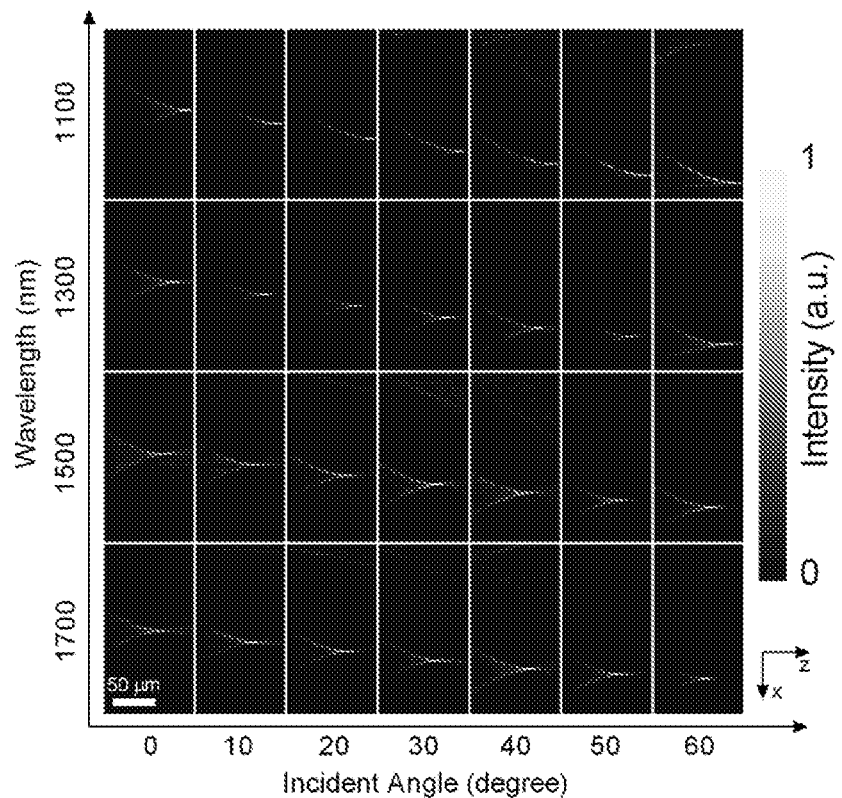
FIG. 6 is a diagram showing intensity distributions of emergent light in the propagation direction (z direction) which are experimentally measured under different incident wavelengths and different incident angles.

FIG. 6 is a diagram showing intensity distributions of emergent light in the propagation direction (z direction) which are experimentally measured under different incident wavelengths and different incident angles. In the figure, only seven discrete angles, i.e., 0°, 10°, 20°, 30°, 40°, 50° and 60°, as well as four discrete wavelengths, i.e., 1100 nm, 1300 nm, 1500 nm and 1700 nm, are shown. In FIG. 6, the individual small windows, corresponding to different incident wavelengths and different incident angles, each show the defocusing-focusing-defocusing changes of the light, where a.u. represents an arbitrary unit. As can be seen from FIG. 6, at the same incident wavelength, the greater the incident angle is, the greater the downward shift of the focus is. Moreover, during the process of increasing the incident angle (from 0° to 60°), no significant monochromatic aberration (such as coma aberration, field curvature and distortion) is generated.

Figure 7:
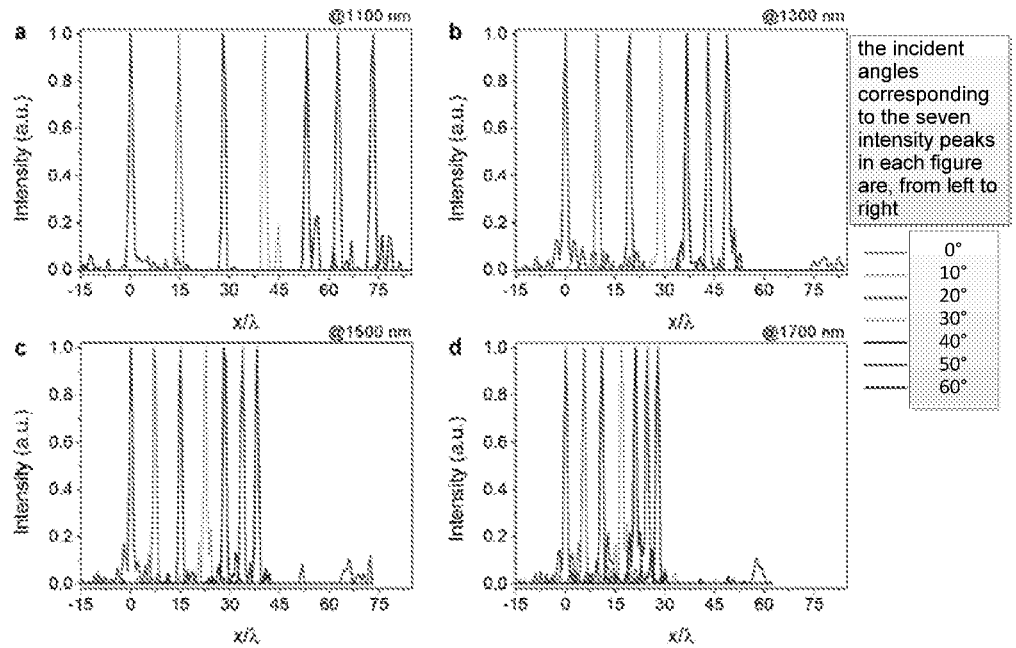
FIG. 7 is a diagram showing normalized focus intensity distributions which are experimentally measured under different incident wavelengths and different incident angles.

FIG. 7 is a diagram showing normalized focus intensity distributions which are experimentally measured under different incident wavelengths and different incident angles. In the figure, only seven discrete angles, i.e., 0°, 10°, 20°, 30°, 40°, 50° and 60°, as well as four discrete wavelengths, i.e., 1100 nm, 1300 nm, 1500 nm and 1700 nm, are shown. In FIG. 7, the abscissa represents coordinates on the focal plane which are normalized respect to the wavelength, with the numerical values on the abscissa obtained by dividing a distance to the central position of the focal plane by the corresponding wavelength; and the unit a.u. of the ordinate represents an arbitrary unit. As can be seen from FIG. 7, for a large incident angle (e.g., 60°), the focusing effect can still be kept, the width of the intensity peak at the focus is almost constant, and the half-peak width is about one wavelength.

To sum up, the Fourier lens (which is based on sub-wavelength artificial micro structure and has a large field of view) provided by the embodiment of the present invention has the following advantages: 1. the change in phase of the incident light caused by each waveguide has low dependence on the incident angle, and a large range of 0°-60° is available for the working angle; 2. the structure has an extremely small dimension of 100 μm×190 μm, and can be easily integrated; 3. the design brings extremely small aberration in nature, and no complicated and precise technology is required to eliminate the aberration; 4. the focal length can be easily designed simply by changing the preset interval; and 5. a wide working waveband of 1100 nm-1700 nm is provided.

Second Embodiment

Figure 8:
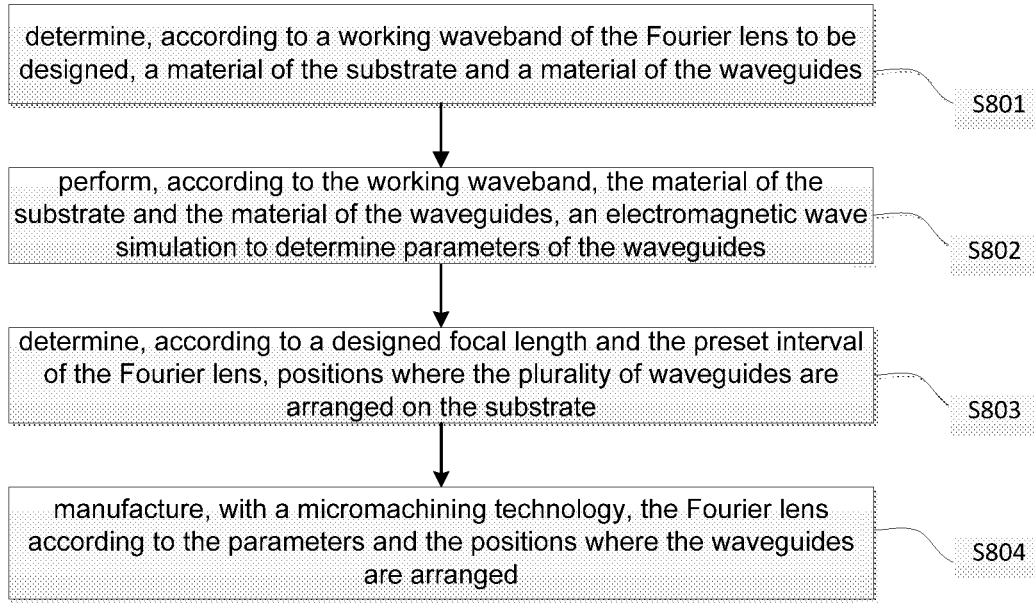
FIG. 8 is a schematic flow chart of a method for designing a Fourier lens provided by an embodiment of the present invention.

FIG. 8 is a schematic flow chart of a method for designing a Fourier lens according to an embodiment of the present invention. As shown in FIG. 8, the method includes steps as follows.

Step S801, the material of the substrate and the material of the waveguides are determined, according to the working waveband of the Fourier lens to be designed.

The material of the substrate and the material of the waveguides are selected according to the working waveband of the Fourier lens to be designed. It is required that the refractive index of the material of the waveguides should be greater than 2.5, and the material of the substrate and the material of the waveguides are both transparent to the working waveband. For example, if the working waveband of the Fourier lens to be designed is 1100 nm-1700 nm, amorphous silicon waveguides (the refractive index of amorphous silicon is 3.5, with no absorption) may be selected, and the substrate may be a glass substrate, a silicon nitride substrate, etc.

Step S802, an electromagnetic wave simulation is performed according to the working waveband, the material of the substrate and the material of the waveguides, to determine parameters of the waveguides.

The parameters of the waveguides include: the height of the waveguides, multiple widths of the waveguides, and a preset interval between adjacent waveguides. Specifically, this step may be achieved by the following sub-steps (1) to (3).

(1) The height of the waveguides is selected according to the working waveband, and the preset interval between adjacent waveguides is selected according to the material of the substrate and the working waveband.

The height of the waveguides is typically greater than 30% of the center wavelength of the working waveband, and the preset interval is smaller than the quotient obtained by dividing the center wavelength of the working waveband by the refractive index of the substrate. For example, if a glass substrate and amorphous silicon waveguides are used, the center wavelength of the working waveband is 1400 nm, and the refractive index of the glass substrate corresponding to the center wavelength is 1.6, then the height of the amorphous silicon waveguides is generally greater than 420 nm, the preset interval is smaller than 875 nm. In this case, the height of the amorphous silicon waveguides may be selected to be 1.05 μm, and the preset interval may be selected to be 450 nm.

(2) According to the material of the waveguides, the selected height of the waveguides and the preset interval, an electromagnetic wave simulation is performed with a FDTD (Finite Difference Time Domain) method or FEM (Finite Element Method), so as to obtain a set of simulation results representative of a correspondence between the widths of the waveguide and the phase delays.

Specifically, when simulation parameters are set according to the material of the waveguides, the selected height of the waveguides and the preset interval, and electromagnetic wave numerical simulation is performed (using periodic boundary conditions), with the FDTD or FEM, on incident light at different incident angles and different wavelengths as well as waveguides of different widths, the following conditions need to be met:

a) phase condition 1: the range of $\varphi_{\theta,\lambda}(W)$ is $[-\pi,\pi)$;

the condition may mean that, for any incident angle (e.g., within a range of) 0°-60° and any incident wavelength (e.g., within a range of 1100 nm-1700 nm), the emergent phase of the waveguides can cover $[-\pi,\pi)$ by changing the width of the waveguide;

b) phase condition 2:

$$\frac{\partial}{\partial \theta}[\varphi_{\theta,\lambda}(W) - \varphi_{\theta,\lambda}(W_1)] \approx 0;$$

the condition may mean that, the phase difference (i.e., phase delay caused to the incident light) between any two waveguides is constant at different incident angles; and c) strength condition: $t_{\theta,\lambda}(W) \geq 0.5$, the condition may mean that, the transmittance of each waveguide is greater than or equal to 0.5 at different incident angles.

Among the above conditions, $\varphi_{\theta,\lambda}(W)$ represents the emergent phase of the waveguide corresponding to an incident angle of $\theta$, an incident wavelength of $\lambda$ and a waveguide width of W, $\theta$ represents the incident angle, W represents the width of the waveguide, $W_1$ represents a random waveguide width, and $t_{\theta,\lambda}(W)$ represents the electric field amplitude transmittance corresponding to an incident angle of $\theta$, an incident wavelength of $\lambda$ and a waveguide width of W.

If the above conditions cannot be met simultaneously, the height of the waveguides and the preset interval may be slightly adjusted and the above simulation steps are repeated until all of the above conditions are met, so as to obtain a set of simulation results meeting the above conditions. Specifically, the set of simulation results are representative of the correspondence between the widths of the waveguide and the phase delays, and the parameters of the waveguide include the height of the waveguide and the preset interval which meet the above conditions.

(3) A plurality of simulation results are selected from the set of simulation results, with the selected simulation results covering phase delays greater than or equal to $-\pi$ and smaller than $\pi$ (i.e., in a range of $[-\pi,\pi)$), and the widths of the waveguides, corresponding to the individual phase delays from the selected simulation results, are added into the parameters of the waveguides of the Fourier lens.

A plurality of waveguides of different widths are selected from the above set of simulation results, with the phase delays corresponding to the plurality of waveguides being in a range of $[-\pi,\pi)$. Corresponding to the example in sub-step (1), waveguides of eight different widths can be selected (it is not limited to eight widths, which is only shown as an example), and the corresponding phase delays are −π, −0.75π, −0.5π, −0.25π, 0, 0.25π, 0.5π and 0.75π, respectively.

Figure 9:
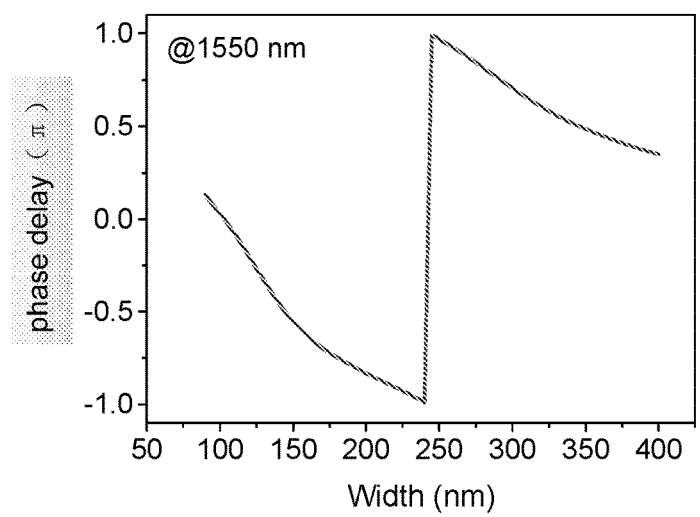
FIG. 9 is a diagram showing simulation results representative of a correspondence between the widths of the waveguide and the phase delays under 1550 nm normal incident light.

FIG. 9 is a diagram showing simulation results representative of the correspondence between the waveguide widths and the phase delays under 1550 nm normal incident light. As shown in FIG. 9, the correspondence between the eight different widths and eight phase delays is that: 160 nm corresponds to −π, 135 nm corresponds to −0.75π, 120 nm corresponds to −0.5π, 110 nm corresponds to −0.25π, 390 nm corresponds to 0, 300 nm corresponds to 0.25π, 250 nm corresponds to 0.5π, and 205 nm corresponds to 0.75π.

Figure 10:
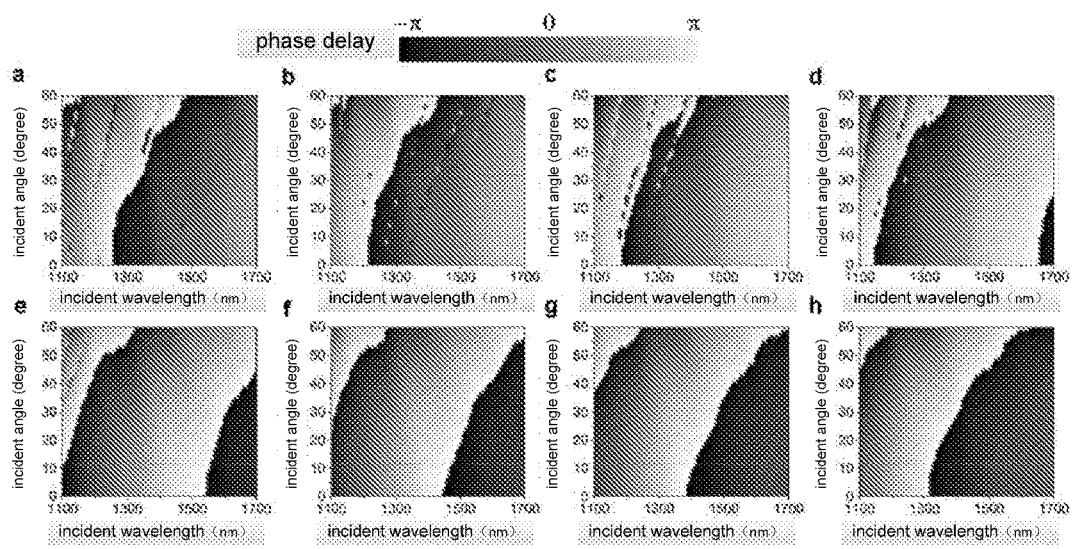
FIG. 10 is a diagram showing simulation results of the phase delays for eight waveguides under different incident wavelengths and different angles.

The phase delays of the above eight waveguides at different incident wavelengths (1100 nm-1700 nm) and different incident angles (0°-60°) are shown in FIG. 10. The width corresponding to FIG. 10a is 390 nm, the width corresponding to FIG. 10b is 300 nm, the width corresponding to FIG. 10c is 250 nm, the width corresponding to FIG. 10d is 205 nm, the width corresponding to FIG. 10e is 160 nm, the width corresponding to FIG. 10f is 135 nm, the width corresponding to FIG. 10g is 120 nm, and the width corresponding to FIG. 10h is 110 nm. As can be seen from FIG. 10, for the same incident wavelength, the difference in phase delays at different incident angles (0°-60°) is relatively small, which further indicates that the range of the working angle of the corresponding Fourier lens is relatively large, with a range of 0°-60° available for the working angle.

Step S803, positions where the plurality of waveguides are arranged on the substrate are determined, according to a designed focal length and the preset interval of the Fourier lens.

First, according to the preset interval, a plurality of positions where the plurality of waveguides are to be arranged on the substrate are determined. Then, phase arrangement of the Fourier lens is determined, according to a distance between each of the positions where the plurality of waveguides are to be arranged and a centerline of the substrate, and according to the designed focal length, where the phase arrangement indicates a phase delay corresponding to each of the positions where the plurality of waveguides are to be arranged. Finally, the positions where the plurality of waveguides are arranged on the substrate are determined according to the phase arrangement.

Specifically, substrate positions at a distance of an integral multiple of the preset interval from the centerline of the substrate are determined as the positions where the plurality of waveguides are to be arranged. For example, if the preset interval is 450 nm, the distances from the positions where the plurality of waveguides are to be arranged to the centerline of the substrate may be 0, 450 nm, 450×2 nm, 450×3 nm, etc. According to the designed focal length and the center wavelength of the working waveband, the phase delay corresponding to each of the positions where the plurality of waveguides are to be arranged is calculated by the following formula, so as to determine the phase arrangement of the Fourier lens:

$$\varphi(r) = -\frac{kr^2}{2f}$$

where φ(r) represents the phase delay corresponding to r, r represents the distance between one of the positions where the plurality of waveguides are to be arranged and the centerline of the substrate, k represents the magnitude of the wave vector corresponding to the center wavelength of the working waveband, $$k = \frac{2\pi}{\lambda},$$

λ represents the center wavelength of the working waveband, and f represents the designed focal length.

According to the correspondence between the phase arrangement and the phase delay, as well as the correspondence between the waveguide width and the phase delay, the width of the waveguide corresponding to each of the positions where the plurality of waveguides are to be arranged is determined, and thus, the positions where the plurality of waveguides are arranged on the substrate are determined. As the preset interval has already been determined, the number of the waveguides depends on the size of the Fourier lens. The size of the Fourier lens may be selected according to actual needs, and is not defined herein.

In one example, amorphous silicon waveguides of eight widths as shown in FIG. 10 are used, the center wavelength of the working waveband is 1.31 μm, the designed focal length is 80 μm, and the correspondence between the distance from each of the positions where the plurality of waveguides are to be arranged to the centerline of the substrate and the width of the waveguide is shown in table 1 (table 1 shows only part of the correspondence; the size of the Fourier lens may be designed according to actual needs, and the specific number of the waveguides and the width of the waveguide corresponding to each of the positions where the plurality of waveguides are to be arranged can be correspondingly determined).

TABLE 1

| Distance (μm) | 0 | 0.45 | 0.9 | 1.35 | 1.8 | 2.25 | 2.7 | 3.15 | 3.6 |
|---|---|---|---|---|---|---|---|---|---|
| Width (nm) | 160 | 300 | 135 | 250 | 110 | 160 | 300 | 120 | 250 |
| Distance (μm) | 4.05 | 4.5 | 4.95 | 5.4 | 5.85 | 6.3 | 6.75 | 7.2 | 7.65 |
| Width (nm) | 110 | 160 | 300 | 120 | 205 | 390 | 135 | 250 | 110 |
| Distance (μm) | 8.1 | 8.55 | 9 | 9.45 | 9.9 | 10.35 | 10.8 | 11.25 | 11.7 |
| Width (nm) | 160 | 300 | 120 | 205 | 390 | 135 | 250 | 110 | 160 |

Step S804, the Fourier lens is manufactured with a micromachining technology, according to the parameters and the positions where the waveguides are arranged.

In particular, the Fourier lens may be manufactured with the commercialized electron beam lithography (EBL), according to the parameters and the positions where the waveguides are arranged; however, other micromachining technologies may also be used.

In the embodiment of the present invention, the material of the substrate and the material of the waveguides are determined according to the working waveband of the Fourier lens to be designed; the electromagnetic wave simulation is performed according to the working waveband, the material of the substrate and the material of the waveguides, so as to determine parameters of the waveguides, with the parameters of the waveguides including the height of the waveguides, multiple widths of the waveguides, and the preset interval between adjacent waveguides; the positions where the plurality of waveguides are arranged on the substrate are determined, according to the designed focal length and the preset interval of the Fourier lens; and the Fourier lens is manufactured with a micromachining technology, according to the parameters and the positions where the waveguides are arranged. For the Fourier lens manufactured by this method, the incident light is locally regulated by means of an array antenna with sub-wavelength structure, specifically, the wave front of the incident light is changed by means of the waveguides of different widths, which does not belong to the scope of geometrical optics. Therefore, the working angle of the Fourier lens does not need to meet the paraxial condition, which makes the range of the working angle of the Fourier lens increased.

Third Embodiment

Figure 11:
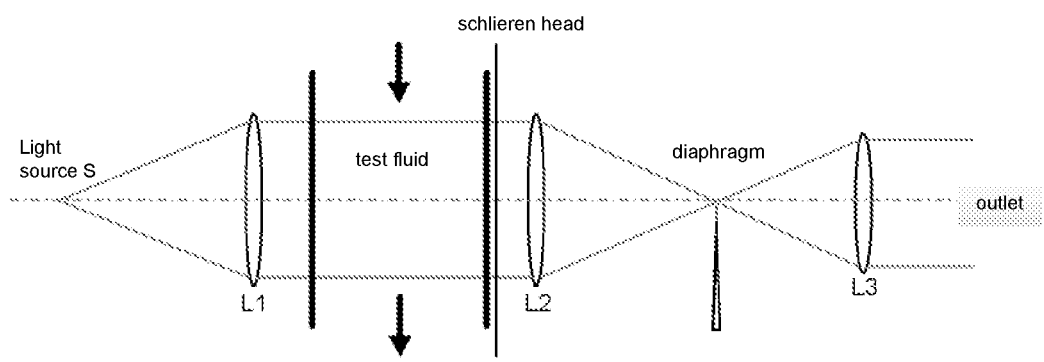
FIG. 11 is a schematic structure diagram of a schlieren apparatus provided by an embodiment of the present invention.

FIG. 11 is a schematic structure diagram of a schlieren apparatus provided by an embodiment of the present invention. As shown in FIG. 11, along a propagation direction of the incident light, the schlieren apparatus sequentially includes a light source, a collimating lens L1, a cavity, a schlieren head, a first lens L2, a diaphragm, a second lens L3 and an outlet. Each of the first lens L2 and the second lens L3 is the Fourier lens as described in the first embodiment, and the cavity is configured for accommodating a test fluid flowing through the schlieren apparatus.

The schlieren apparatus is a device that is very useful in aerodynamics and combustion dynamics, and can be applied to flame photography and flow visualization technologies. The diaphragm used in the schlieren apparatus may be a knife edge, a high pass filter, a bandpass filter or the like. For an object of weak phase, a phase change may be converted into an intensity change by using a high pass filter or blocking off half of the spatial spectrum (by using a bandpass filter).

In the embodiment of the present invention, the schlieren apparatus includes two Fourier lenses. As to the Fourier lenses, the incident light is locally regulated by means of an array antenna with sub-wavelength structure, specifically, the wave front of the incident light is changed by means of the waveguides of different widths, which does not belong to the scope of geometrical optics. Therefore, the working angle of the Fourier lens does not need to meet the paraxial condition, which makes the range of the working angle of the Fourier lens increased, thereby increasing the range of the working angle of the schlieren apparatus.

A person skilled in the art would clearly understand that, for convenience and simplicity of the description, the specific working processes of the method for designing the Fourier lens and the schlieren apparatus as described above may refer to the corresponding process described in the embodiment of the Fourier lens, which will not be repeated herein.

The method for designing the Fourier lens as well as the schlieren apparatus provided by the embodiments of the present invention have same technical features as the Fourier lens provided in the above-described embodiment, and therefore, the same technical problem can be solved and the same technical effects can be achieved.

The flow charts and the block diagrams in the drawings show the system architectures, functions and operations that may be implemented for the Fourier lens, the method for designing the Fourier lens designing method as well as the schlieren apparatus according to the embodiments of the present invention. In this regard, each box in the flow charts or block diagrams may represent a module, a program segment or a part of codes, with the module, the program segment or the part of codes including one or more executable instructions for implementing a specified logical function. It should also be noted that, in some alternative implementations, the functions indicated in the boxes may also take place in an order different from that indicated in the figures. For example, two consecutive boxes actually may be executed substantially in parallel, or they may sometimes be executed in reverse order, depending on the involved functions. It should further be noted that each box in the block diagrams and/or the flow charts as well as a combination of the boxes in the block diagrams and/or the flow charts may be implemented by a special hardware-based system capable of executing specified functions or actions, or may be implemented by a combination of special hardware and computer instructions.

In the several embodiments provided by the present application, it should be understood that the disclosed Fourier lens, the method for designing the Fourier lens and the schlieren apparatus may also be realized in other manners.

When being implemented in the form of software functional units and sold or used as independent products, the functions may be stored in a nonvolatile computer readable storage medium executable by a processor. Based on such understanding, the technical solution of the present invention in itself, or a part of the technical solution of the present invention that makes contributions to the prior art, or a part of the technical solution may be embodied in the form of a software product. The computer software product is stored in a storage medium, and include some instructions for enabling a computer device (which may be a personal computer, a server, a network device or the like) to execute all or some of the steps of the methods provided by the embodiments of the present invention. The storage medium described above includes various mediums capable of storing program codes, such as a USB flash disk, a mobile hard disk, a read-only memory (ROM), a random access memory (RAM), a magnetic disk, or an optical disk.

Finally, it should be noted that the above embodiments are merely particular implementations of the present invention, and used to illustrate the technical solutions of the present invention, rather than limiting the invention, thus the scope of protection of the present invention is not limited thereto. Although the present invention has been described in detail with reference to the foregoing embodiments, it should be understood by a person of ordinary skills in the art that, within the technical scope disclosed by the present invention, any person skilled in the art would still make modification or readily conceive variation to the technical solutions disclosed in the embodiments, or make equivalent substitutions to part of the technical features by. These modifications, variations or substitution would not cause the substance of the corresponding technical solutions to depart from the spirit and scope of the technical solutions of the embodiments of the present invention, and should be covered by the scope of protection of the present invention. Therefore, the scope of protection of the present invention shall be determined by the scope of protection of the appended claims.

The invention claimed is:

1. A method for designing a Fourier lens, wherein the Fourier lens comprises a substrate and a plurality of cuboid waveguides, wherein the plurality of waveguides are arranged on the substrate in parallel and spaced from each other at a preset interval; a material of the substrate and a material of the plurality of cuboid waveguides are all transparent to a working waveband of the Fourier lens, and the preset interval is smaller than a quotient obtained by dividing a center wavelength of the working waveband by a refractive index of the substrate, the plurality of cuboid waveguides have a plurality of widths, the plurality of cuboid waveguides of different widths correspond to different phase delays, and individual waveguides are arranged on the substrate according to phase delays required at different positions, the method comprising:

determining, according to a working waveband of the Fourier lens to be designed, a material of the substrate and a material of the waveguides;

performing, according to the working waveband, the material of the substrate and the material of the waveguides, an electromagnetic wave simulation to determine parameters of the waveguides, wherein the parameters of the waveguides comprise: a height of the waveguides, a plurality of widths of the waveguides, and a preset interval between adjacent waveguides;

determining, according to a designed focal length and the preset interval of the Fourier lens, positions where the plurality of waveguides are arranged on the substrate; and manufacturing, with a micromachining technology, the Fourier lens according to the parameters and the positions where the waveguides are arranged, wherein the performing further comprises:

selecting the height of the waveguides according to the working waveband, and selecting the preset interval between adjacent waveguides according to the material of the substrate and the working waveband;

performing, according to the material of the waveguides, the selected height of the waveguides and the preset interval, an electromagnetic wave simulation with a Finite Difference Time Domain method or a Finite Element Method, so as to obtain a set of simulation results representative of a correspondence between the widths of the waveguides and phase delays; and selecting a plurality of simulation results from the set of simulation results, with the selected simulation results covering the phase delays greater than or equal to $-\pi$ and smaller than $\pi$, and adding the widths of the waveguides, corresponding to the individual phase delays of the selected simulation results, into the parameters of the waveguides of the Fourier lens.

2. The method according to claim 1, wherein the step of determining according to a designed focal length and the preset interval of the Fourier lens positions where the plurality of waveguides are arranged on the substrate comprises:

determining, according to the preset interval, a plurality of positions where the plurality of waveguides are to be arranged on the substrate;

determining phase arrangement of the Fourier lens, according to a distance between each of the positions where the plurality of waveguides are to be arranged and a centerline of the substrate, and according to the designed focal length, wherein the phase arrangement indicates a phase delay corresponding to each of the positions where the plurality of waveguides are to be arranged; and determining, according to the phase arrangement, the positions where the plurality of waveguides are arranged on the substrate.

3. The method according to claim 2, wherein the phase delay corresponding to one of the positions where the plurality of waveguides are to be arranged is calculated by the following formula:

$$\varphi(r) = -\frac{kr^2}{2f},$$

where $\varphi(r)$ represents the phase delay corresponding to r, r represents the distance, k represents a magnitude of a wave vector corresponding to a center wavelength of the working waveband, and f represents the designed focal length.

4. The method according to claim 1, wherein the material of the substrate comprises glass, silicon dioxide or silicon nitride.

5. The method according to claim 1, wherein the material of the waveguides comprises amorphous silicon, germanium, titanium dioxide or tellurium.

6. The method according to claim 1, wherein the substrate is a glass substrate, and the waveguides are amorphous silicon waveguides;

the preset interval is 450nm; and the amorphous silicon waveguides have eight widths, with the eight widths being 390nm, 300nm, 250nm, 205nm, 160nm, 135nm, 120nm and 110nm, respectively.

7. The method according to claim 6, wherein a height of each of the amorphous silicon waveguides is 1.05 μm, and a length of each of the amorphous silicon waveguides is greater than or equal to 10 μm.

* * * * *